United States Patent Office.

WALDRON J. CHEYNEY, OF WALLINGFORD, AND EMIL F. DIETERICHS, OF PHILADELPHIA, PENNSYLVANIA.

Letters Patent No. 69,318, dated October 1, 1867; antedated September 19, 1867.

IMPROVED ENAMEL TO BE APPLIED TO METALS, EARTHENWARE, ARTIFICIAL STONE, AND OTHER MATERIALS.

The Schedule referred to in these Letters Patent and making part of the same.

TO ALL WHOM IT MAY CONCERN:

Be it known that we, WALDRON J. CHEYNEY, of Wallingford, Delaware county, State of Pennsylvania, and EMIL F. DIETERICHS, of Philadelphia city and county, in said State, have invented a new and useful Enamel; and we do hereby declare that the following is a full and exact description of the same.

Our enamel may be applied to building-blocks, columns, cornices, sills, caps, and balusters, tiles, door-knobs, shields and locks, mantels, bath-tubs, wash-stands and basins, urinals, table-tops, and other articles of use and ornament, in connection with all kinds of buildings; to pottery, porcelain, and hollow-ware, including articles of clay or metal; to tomb-stones, and generally to the surfaces of mineral and metallic substances, as slate, &c.

Our enamel is composed of cryolite or its chemical equivalents, and silica, fused together in a crucible, and applied as the enamels in general use hitherto have been applied.

The following proportions of the minerals named produce a good enamel, although these proportions may be varied without material detriment: Fifty pounds of sand, (silicious,) twenty-five pounds of powdered cryolite. To these materials may be added, when desired, any of the metallic oxides ordinarily used in the production of enamel by the processes hitherto practised.

Having thus described our invention, we claim, and desire to secure by Letters Patent, as a new manufacture—

An enamel composed of cryolite or its chemical equivalents, and silica, fused together substantially as above set forth.

WALDRON J. CHEYNEY,
E. F. DIETERICHS.

Witnesses:
    J. E. SHAW,
    GEO. E. BUCKLEY.